(12) United States Patent
Ewans

(10) Patent No.: US 6,973,739 B2
(45) Date of Patent: Dec. 13, 2005

(54) RIGGER-SPREAD MEASURING INSTRUMENTS

(76) Inventor: John Frayn Ewans, 201 West Wycombe Road, High Wycombe, Buckinghamshire HP12 3AW (GB)

( * ) Notice: Subject to any disclaimer, the term of this patent is extended or adjusted under 35 U.S.C. 154(b) by 0 days.

(21) Appl. No.: 10/866,226

(22) Filed: Jun. 12, 2004

(65) Prior Publication Data

US 2004/0250438 A1 Dec. 16, 2004

(30) Foreign Application Priority Data

Jun. 12, 2003 (GB) ................................. 0313583

(51) Int. Cl.$^7$ ............................................. G01B 5/14
(52) U.S. Cl. ........................... 33/783; 33/811; 33/663; 33/675
(58) Field of Search .................. 33/783, 806, 810, 33/811, 663, 558.01, 558.02, 558.04, 675, 33/DIG. 9, 1 F, 665

(56) References Cited

U.S. PATENT DOCUMENTS

| | | | | |
|---|---|---|---|---|
| 1,703,736 A | * | 2/1929 | Jacob | 33/675 |
| 2,770,046 A | * | 11/1956 | Wichmann | 33/811 |
| 4,416,063 A | * | 11/1983 | Nestor et al. | 33/810 |
| 2005/0044740 A1 | * | 3/2005 | Hansen | 33/783 |

FOREIGN PATENT DOCUMENTS

| | | |
|---|---|---|
| DE | 37 09 187 A1 | 9/1988 |
| JP | 2003-344003 | 12/2003 |

* cited by examiner

Primary Examiner—Christopher W. Fulton
(74) Attorney, Agent, or Firm—Davis & Bujold, P.L.L.C.

(57) ABSTRACT

An instrument for measuring rigger-spread of a boat has an elongate casing 1 for support athwartships of the boat with a shoulder 2 of the casing 1 abutting the outside of the gunwale 4 opposite the rigger 5 and a slidingly-adjustable shoulder 6 abutting the opposite gunwale 9. A measuring tape 10 is extendable longitudinally from the casing 1 to the oarlock 14 of the rigger 5 to give a reading of spread, the extendable length being limited in dependence upon the spacing between the shoulders 2,6 of the casing 1 such that this length is increased or decreased by half the amount of any increase or decrease, respectively, of that spacing. Limitation of the extendable length involves a mechanism in which the two ends 18,19 of a flexible strip 15 or wire are secured respectively to the sliding shoulder 6 and the casing 1 so as to define a loop that is caught by a hook 16 of the tape 10 in limiting tape-extension. A modified limiting mechanism involves a step-down 2:1 coupling via pinions 23,24 between a rack 22 fixed to a sliding shoulder 20 and a rack 25 that engages a stop pin 26 of the measuring tape 27.

15 Claims, 3 Drawing Sheets

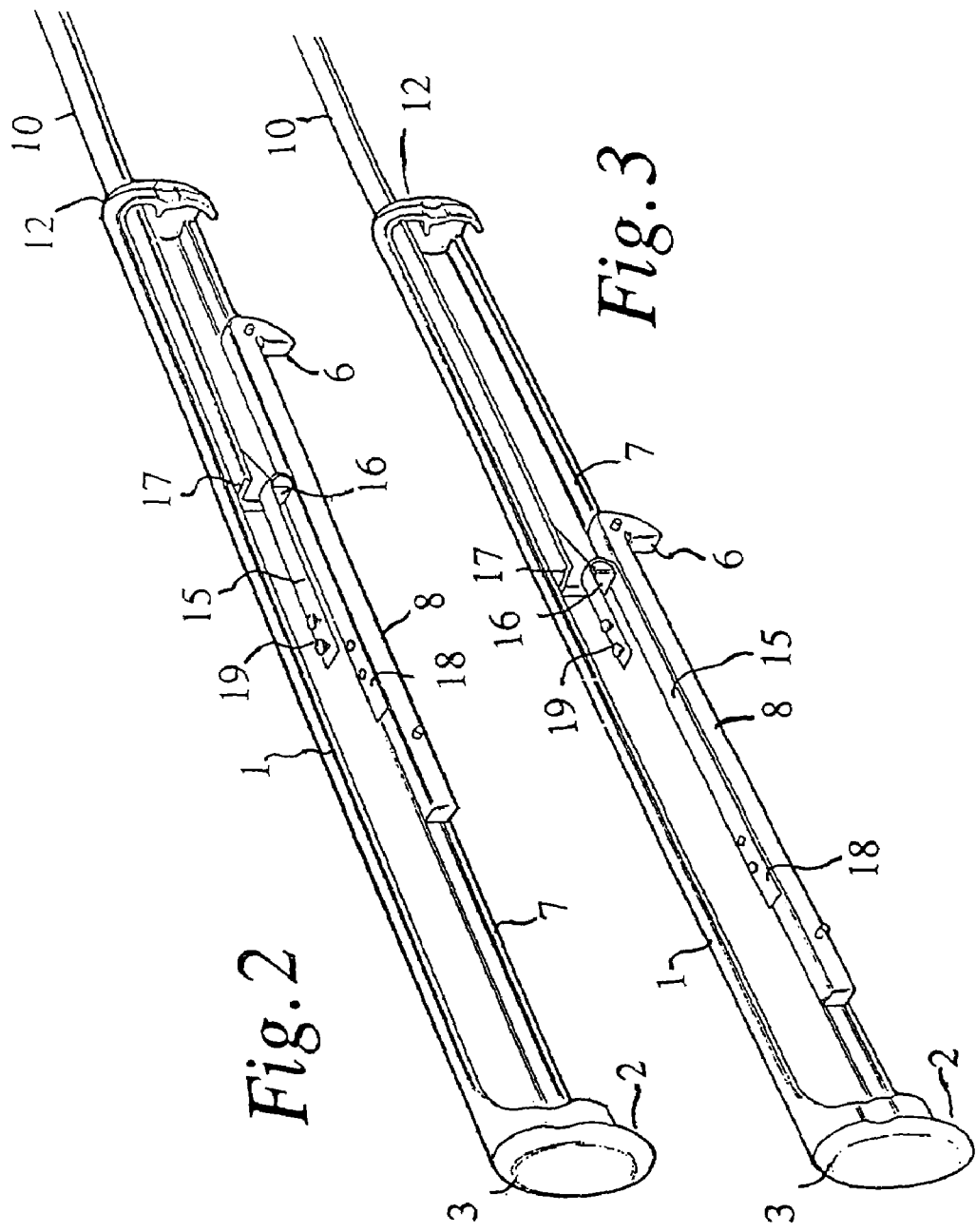

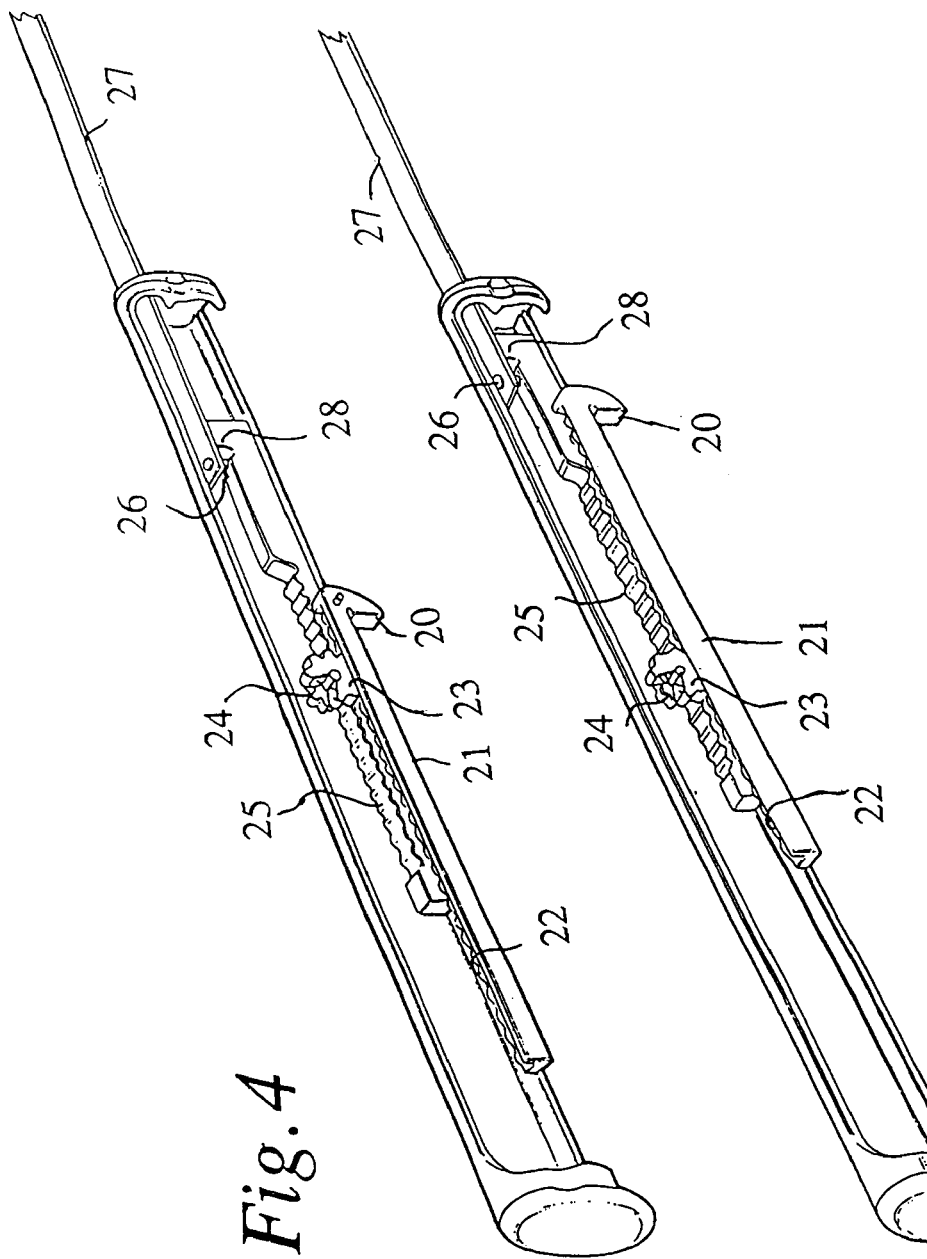

RIGGER-SPREAD MEASURING INSTRUMENTS

FIELD OF THE INVENTION

This invention relates to instruments for measuring rigger-spread of rowing and sculling boats.

The riggers or outriggers of rowing and sculling boats are adjusted according to the needs of the individual rower or sculler, or more generally to give a best compromise where use is to be by more than one person, for efficient propulsion of the boat. Each rigger is adjusted with reference to measurements of three principal parameters, namely, height, spread or span, and pitch. The spread of the rigger of a rowing boat is the distance from the centre of the boat to the centre of its oarlock, whereas for a sculling boat the corresponding parameter is normally expressed in terms of span which is the distance between the centres of the oarlocks of the opposed pair of riggers, or in other words, the sum of the spread of each.

It is an object of the present invention to provide a form of instrument that is advantageous for the measurement of rigger-spread as referred to above.

SUMMARY OF THE INVENTION

According to one aspect of the present invention an instrument for measuring rigger-spread of a boat, includes an elongate base member for support athwartships of the boat and having a first abutment element for abutment with the side of the boat opposite the rigger, and a second abutment element for adjustment longitudinally of the base member to abut the side of the boat from which the rigger extends. The instrument further includes an elongate measuring element for longitudinal extension from the base member to the oarlock of the rigger, and limiting means for limiting the length of the measuring element extendable from the base member. The length of the measuring element extendable from the base member is limited in dependence upon the spacing between the first and second elements such that the extendable length is increased or decreased by half the amount of any increase or decrease respectively, in the spacing between the first and second abutment elements.

With the instrument of the invention, the extendable length of the measuring element is increased or decreased by only half the extent to which the location of the abutment element has to be adjusted to accommodate respectively for an increase or decrease in boat-width. Measurement of spread can thus be obtained by suitable calibration of the measuring element for reading against the pivot pin of the oarlock.

The limiting means may involve engagement of the measuring element with a loop of a flexible strip or wire which is coupled at its two ends to the base member and the second abutment element respectively. Alternatively, it may involve two racks of which a first moves longitudinally with the second abutment element and the second of which is driven from the first rack for displacement relative to the base member in accordance with half the displacement of the first rack.

BRIEF DESCRIPTION OF THE DRAWINGS

An instrument in accordance with the present invention for measuring rigger-spread of a boat, will now be described, by way of example, with reference to the accompanying drawings, in which:

FIGS. 2 and 3 are sectional views of the rigger-spread measuring instrument of FIG. 1, illustrating the mechanism of the instrument in respective operative states; and FIGS. 4 and 5 are sectional views corresponding to FIGS. 2 and 3, of a modified form of the rigger-spread measuring instrument of FIG. 1.

DESCRIPTION OF THE INVENTION

Figure 1:
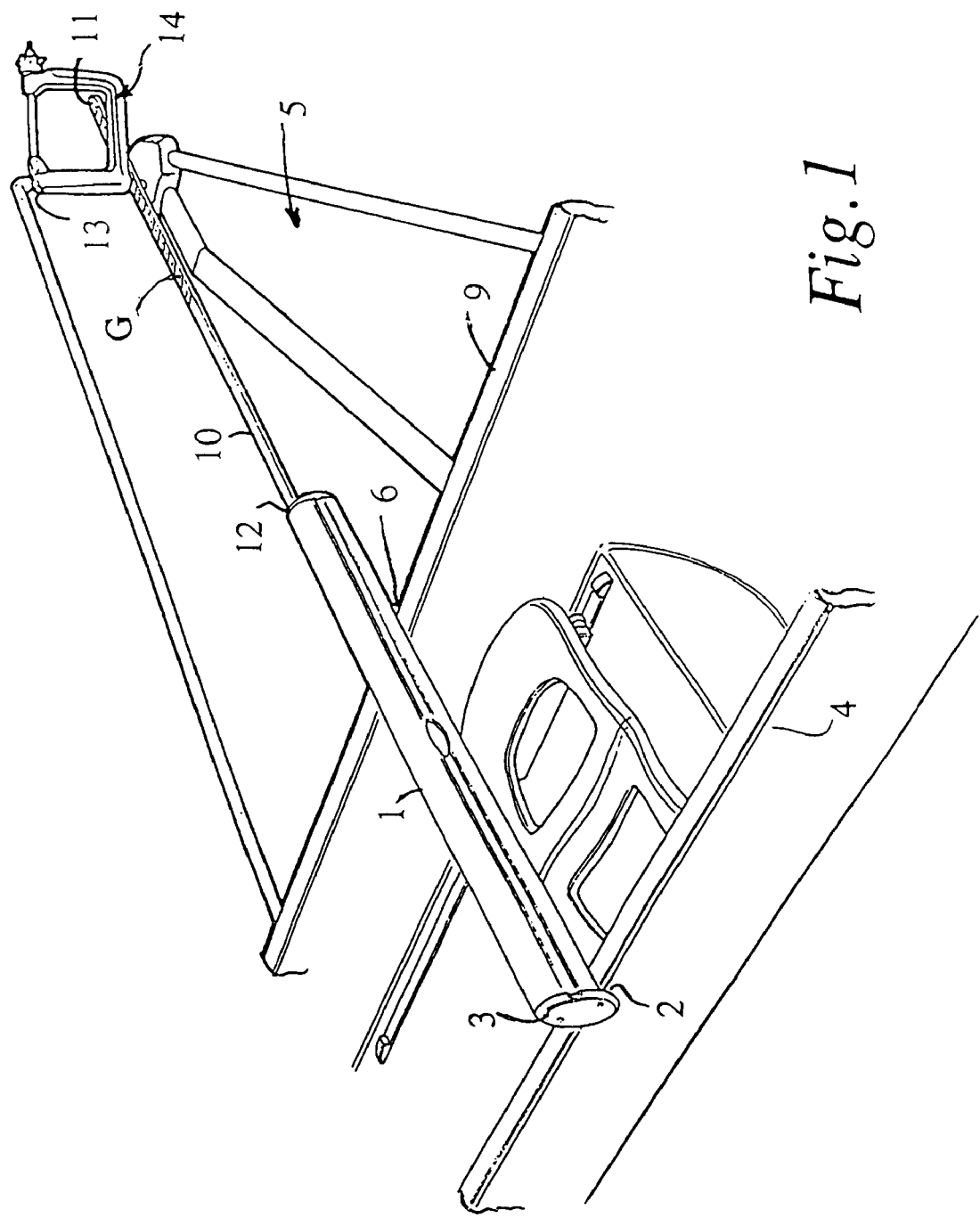
FIG. 1 is illustrative of the instrument according to the invention in use measuring rigger-spread of a rowing boat.

The instrument to be described is for use in measuring rigger-spread of a rowing boat in that it provides measurement directly of the distance from the centre of the boat to the pivot pin of the oarlock. It will be described in that context, but it may be used conveniently also for determining the span of a sculling boat by taking two readings of the distance from the centre of the boat to the two oarlocks respectively, and adding them together.

Referring to FIGS. 1 to 3, the rigger-spread measuring instrument involves an outer, elongate casing 1 which in use (as shown in FIG. 1) extends athwartships of the boat with a downwardly-projecting shoulder 2 at its near end 3 abutting the outside of the gunwale 4 opposite the relevant outwardly-extending rigger 5. A second, abutment shoulder 6 that projects downwardly through a slot 7 in the underside of the casing 1, is part of a slider 8 that slides longitudinally within the casing 1. The location of the shoulder 6 is adjusted by sliding it along the slot 7 into abutment with the outside of the other gunwale 9 of the boat, so that the spacing between the adjustable shoulder 6 and the fixed shoulder 2 at the near end 3 is representative of the boat-width at the rigger 5.

A glass-reinforced measuring tape 10, which apart from its leading end 11 is normally retracted fully into the casing 1, is extendable longitudinally through a slot (not shown) in the far end 12 of the casing 1 for measuring the spread. While the shoulder 6 is held against the gunwale 9, the tape 10 is extended longitudinally from within the casing 1 until it can be withdrawn no further. The extent to which extension is limited in this way is dependent upon the location of the shoulder 6 along the slot 7, to the effect that the required measurement of spread is given by a reading taken from graduations G of the tape 10, against the pivot pin 13 of an oarlock 14 supported by the rigger 5.

The limitation on the extendable length of the measuring tape 10 results from retention of it within the casing 1 under the action of a mechanism that comprises a flexible, metal or other strip 15 (a wire may be used instead) and a hook 16 on the trailing end 17 of the measuring tape 10. The strip 15 has one end 18 attached to the slider 8, and between the end 18 is looped to its other end 19 attached to the casing 1 itself. During extension of the tape 10, the hook 16 eventually catches in the loop defined by the strip 15, as illustrated in FIGS. 2 and 3, and this is effective to preclude further extension of the measuring tape 10 while the shoulder 6 remains held against the gunwale 9. The tape 10 is calibrated with graduations G to give in these circumstances a direct and accurate reading against the pivot pin 13 of the spread value.

The action of the strip 15 in conjunction with the hook 16 to limit the extension of the measuring tape 10 is such that the reading of spread taken from the graduations G of the tape 10 at the pivot pin 13 is, appropriately, a measure of the distance from the fixed shoulder 2 to the pivot pin 13 reduced by half the spacing between the fixed and adjustable shoulders 2 and 6. To this end, the length of the measuring tape 10 retained within the casing 1 by engagement of the hook 16 with the strip 15 is equal to half the spacing between the shoulders 2 and 6 less a constant dependent on the set up within the casing 1. The looping of the strip 15 provides the 2:1 step-down coupling required to translate by half any increase or decrease of the spacing between the shoulders 2 and 6 into an increase or decrease, respectively, of the extendable length of the measuring tape 10.

Operation of the mechanism of the instrument in the above respect can be appreciated, for example, by comparison of FIGS. 2 and 3. From the condition represented in FIG. 2, sliding of the shoulder 6 inwardly to reduce the spacing from the shoulder 2 and bring about the condition represented in FIG. 3, retracts the measuring tape 10 into the casing 1. Because the strip 15 is looped, only half the amount of this movement of the shoulder 6 is conveyed to the hook 16 for retraction of the tape 10.

In a corresponding manner, increase of the spacing between the shoulder 6 and the shoulder 2 from the condition represented in FIG. 3, disengages the strip 15 from the hook 16 to enable the tape 10 to be extended further from within the casing 1 towards the condition represented in FIG. 2. The extendable length of the tape 10 is, however, limited by the looping of the strip 15 and the re-engagement of the hook 16 with it, to only one half of the increase in spacing between the shoulders 2 and 6.

A modified form of the rigger-spread measuring instrument described above with reference to FIGS. 1 to 3, is illustrated in FIGS. 4 and 5, and will now be described.

Referring to FIGS. 4 and 5, the modified instrument is essentially the same as the instrument of FIGS. 1 to 3 apart from the use of an alternative form of 2:1 step-down coupling. In this case, the moveable shoulder 20 (corresponding to the shoulder 6) is part of a slider 21 that has rack teeth 22 which are engaged by a pinion 23 (shown partly broken away). The pinion 23 rotates in accordance with longitudinal movement of the slider 21 and drives a pinion 24 that is engaged with a longitudinally-sliding rack 25. The diameter of the pinion 24 is half that of the pinion 23 so that the rack 25 is driven longitudinally in the same sense as, but at half the rate of, any movement of the slider 21. A stop-pin 26 on the measuring tape 27 of the instrument in this case, engages with a shoulder 28 of the rack 25, so that the reading from the tape 27 gives the relevant spread measurement directly.

What is claimed is:

1. An instrument for measuring spread of a rigger which extends outwardly from one of two opposite sides of a boat for supporting an oarlock of the boat, the instrument comprising: an elongate base member for extending athwartships of the boat, the base member having first and second abutment elements spaced from one another for abutment with the two sides respectively of the boat, the second abutment element being movable longitudinally of the base member relative to the first abutment element for bringing the second abutment element into abutment with said one side of the boat while the first abutment element abuts the other, opposite side of the boat; an elongate measuring element that is longitudinally extendable from the base member to the oarlock of the rigger; and a limiting mechanism that is operative to limit the length of the measuring element extendable from the base member, the length of the measuring element extendable being limited by the limiting mechanism in dependence upon the spacing between the first and second abutment elements such that the extendable length is increased by half the amount of any increase in the spacing and decreased by half the amount of any decrease in the spacing.

2. The instrument according to claim 1 wherein the first abutment element is a portion of the base member.

3. The instrument according to claim 1 including a slider for sliding longitudinally of the base member, and wherein the second abutment element is part of the slider.

4. The instrument according to claim 1 wherein the limiting mechanism includes an elongate element that defines a flexible loop having two ends that are coupled respectively to the base member and the second abutment element, and wherein a hook element is coupled to the measuring element to engage the loop for limiting the extendable length of the measuring element.

5. The instrument according claim 4 wherein the elongate element is a flexible strip.

6. The instrument according to claim 4 wherein the elongate element is a wire.

7. The instrument according to claim 1 wherein the limiting mechanism comprises a first elongate rack that is coupled to the second abutment element for longitudinal displacement with the second abutment element relative to the base member, a first pinion engaged with the first rack to be driven in rotation by longitudinal displacement of the first rack relative to the base member, a second elongate rack for longitudinal displacement relative to the base member, and a second pinion coupled to the first pinion to rotate therewith, the second pinion being engaged with the second rack to drive the second rack in longitudinal displacement relative to the base member at half the rate of longitudinal displacement of the first rack relative to the base member, and wherein the extendable length of the measuring element is limited in dependence upon the longitudinal displacement of the second rack relative to the base member.

8. The instrument according to claim 7 wherein the second pinion has a diameter half that of the first pinion.

9. The instrument according to claim 7 wherein the second rack includes an abutment for engagement by the measuring element in limiting the extendable length of the measuring element.

10. The instrument according to claim 1 wherein the base member comprises a casing for the instrument and the first abutment element is a shoulder of the casing.

11. An instrument for measuring spread of a rigger which extends outwardly from one of two opposite sides of a boat for supporting an oarlock of the boat, the instrument comprising: an elongate base member for extending athwartships of the boat, the base member having first and second abutment elements spaced from one another for abutment with the two sides respectively of the boat, the second abutment element being movable longitudinally of the base member relative to the first abutment element for bringing the second abutment element into abutment with said one side of the boat while the first abutment element abuts the other, opposite side of the boat; an elongate measuring element that is longitudinally extendable from the base member to the oarlock of the rigger; and a limiting mechanism for limiting the length of the measuring element extendable from the base member, the limiting mechanism including a coupling that is operative between the second abutment element and the measuring element to change the extendable length of the measuring element in response to change of the spacing between the first and second abutment elements, the change of the extendable length being one half, and of the same sense as, the change of spacing between the first and second abutment elements.

12. The instrument according to claim 11 wherein the coupling comprises a looped element having two ends that are coupled respectively to the base member and the second abutment element, and wherein a further element is coupled to the measuring element for engagement with the looped element for limiting the extendable length of the measuring element.

13. The instrument according to claim 11 wherein the coupling comprises first and second rack members that are displaceable relative to the base member, the first rack member being displaced relative to the base member in accordance with change of the spacing between the first and second abutment elements, pinion means responsive to displacement of the first rack member relative to the base member for displacing the second rack member relative to the base member in accordance with half the displacement of the first rack member, and wherein the extendable length of the measuring element is limited in accordance with the displacement of the second rack member relative to the base member.

14. The instrument according to claim 13 wherein the second rack member has an abutment for engagement by the measuring element in limiting the extendable length of the measuring element.

15. An instrument for measuring spread of a rigger which extends outwardly from one of two opposite sides of a boat for supporting an oarlock of the boat, the instrument comprising: an elongate base member for extending athwartships of the boat, the base member having two abutment elements spaced from one another for abutting the opposite sides of the boat respectively, at least one of the abutment elements being movable longitudinally of the base member relative to the other abutment element for adjusting the spacing between them in bringing about their abutment as aforesaid with the two sides of the boat respectively; an elongate measuring element that is longitudinally extendable from the base member to the oarlock of the rigger; and a limiting mechanism for limiting the length of the measuring element extendable from the base member, the limiting mechanism being operative to change the extendable length of the measuring element in response to change of the spacing between the two abutment elements, the change of the extendable length being one half, and of the same sense as, the change of spacing between the two elements.

* * * * *